(12) United States Patent
Hirata et al.

(10) Patent No.: US 11,894,565 B2
(45) Date of Patent: Feb. 6, 2024

(54) POWDER FOR SOLID OXIDE FUEL CELL AIR ELECTRODE AND METHOD OF MANUFACTURING SAME

(71) Applicant: SAKAI CHEMICAL INDUSTRY CO., LTD., Osaka (JP)

(72) Inventors: Norimune Hirata, Osaka (JP); Minoru Yoneda, Osaka (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 459 days.

(21) Appl. No.: 17/277,707

(22) PCT Filed: Aug. 5, 2019

(86) PCT No.: PCT/JP2019/030737
§ 371 (c)(1),
(2) Date: Mar. 18, 2021

(87) PCT Pub. No.: WO2020/066301
PCT Pub. Date: Apr. 2, 2020

(65) Prior Publication Data
US 2021/0351416 A1    Nov. 11, 2021

(30) Foreign Application Priority Data

Sep. 27, 2018 (JP) ................................ 2018-181853

(51) Int. Cl.
| | |
|---|---|
| *H01M 4/90* | (2006.01) |
| *C01G 51/00* | (2006.01) |
| *H01M 4/86* | (2006.01) |
| *H01M 8/12* | (2016.01) |

(52) U.S. Cl.
CPC .......... *H01M 4/9033* (2013.01); *C01G 51/70* (2013.01); *C01P 2002/52* (2013.01); *C01P 2006/12* (2013.01); *C01P 2006/40* (2013.01); *C01P 2006/80* (2013.01); *H01M 2004/8689* (2013.01); *H01M 2008/1293* (2013.01)

(58) Field of Classification Search
CPC . B01J 23/10; B01J 23/002; B01J 23/34; B01J 23/70; B01J 35/006; B01J 35/1014; B01J 37/0027; B01J 37/0063; B01J 37/08; H01M 2004/8689; H01M 2008/1293; H01M 4/9033; C01P 2002/52; C01P 2006/12; C01P 2006/40; C01P 2002/34; C01P 2006/80; C01P 2004/60; C01P 2002/90; C01G 51/70
USPC ................................................. 502/303, 525
See application file for complete search history.

(56) References Cited

U.S. PATENT DOCUMENTS

| | | | | |
|---|---|---|---|---|
| 5,093,301 | A | * | 3/1992 | Chu .................... B01J 23/00 502/524 |
| 6,352,955 | B1 | * | 3/2002 | Golden ................ B01J 23/002 502/302 |
| 9,070,946 | B2 | | 6/2015 | Goto |
| 10,056,620 | B2 | | 8/2018 | Ohmori et al. |
| 2009/0200519 | A1 | * | 8/2009 | Sawaki ............. C01G 49/0018 252/519.1 |
| 2011/0143255 | A1 | | 6/2011 | Jain et al. |
| 2013/0244132 | A1 | | 9/2013 | Ohmori et al. |
| 2014/0162149 | A1 | | 6/2014 | Niimi et al. |
| 2015/0099197 | A1 | | 4/2015 | Nakashima et al. |
| 2018/0131007 | A1 | | 5/2018 | Fujisaki et al. |
| 2018/0198150 | A1 | | 7/2018 | Kim et al. |
| 2019/0237768 | A1 | | 8/2019 | Shimada et al. |

FOREIGN PATENT DOCUMENTS

| | | | | |
|---|---|---|---|---|
| CN | 101784486 | A | | 7/2010 |
| JP | 2004-155600 | A | | 6/2004 |
| JP | 2004203726 | A | * | 7/2004 ............. C01B 13/32 |
| JP | 2006-012764 | A | | 1/2006 |
| JP | 2006040612 | A | | 2/2006 |
| JP | 2007031216 | A | | 2/2007 |
| JP | 2009-035447 | A | | 2/2009 |
| JP | 2012-043638 | A | | 3/2012 |
| JP | 2012-048893 | A | | 3/2012 |
| JP | 5520210 | B | | 6/2014 |
| JP | 2016047780 | A | | 4/2016 |
| JP | 2017022105 | A | | 1/2017 |

(Continued)

OTHER PUBLICATIONS

English translation of the Written Opinion for PCT/JP2019/030737. (Year: 2019).*
International Search Report for PCT/JP2019/030737, dated Oct. 29, 2019, 5 pages.

*Primary Examiner* — Patricia L. Hailey
(74) *Attorney, Agent, or Firm* — Stinson LLP

(57) ABSTRACT

A powder material for an air electrode in a solid oxide fuel cell, the powder material being a powder of a metal composite oxide having a perovskite crystal structure represented by:

$$Al_{1-x}A2_xBO_{3-\delta},$$

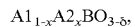

where the element A1 is at least one selected from the group consisting of La and Sm, the element A2 is at least one selected from the group consisting of Ca, Sr, and Ba, the element B is at least one selected from the group consisting of Mn, Fe, Co, and Ni, x satisfies 0<x<1, and δ is an oxygen deficiency amount. The powder has a specific surface area of 20 m²/g or more, satisfies (Crystallite diameter/Specific surface area-based particle diameter)≥0.3, and contains elements M in an amount of 300 ppm or less in terms of atoms, the elements M being other than the elements A1, A2 and B, and oxygen.

9 Claims, No Drawings

(56) References Cited

FOREIGN PATENT DOCUMENTS

| | | | | |
|---|---|---|---|---|
| JP | 2017065991 A | | 4/2017 | |
| JP | 2017533540 A | | 11/2017 | |
| JP | 2018-037158 A | | 3/2018 | |
| JP | 2020055704 A | * | 4/2020 | ............ Y02E 60/50 |
| WO | 2018084279 A1 | | 10/2019 | |

* cited by examiner

POWDER FOR SOLID OXIDE FUEL CELL AIR ELECTRODE AND METHOD OF MANUFACTURING SAME

REFERENCE TO RELATED APPLICATIONS

This application is a U.S. national stage application of International Patent Application No. PCT/JP2019/030737, filed Aug. 5, 2019, which claims the benefit of Japanese Patent Application No. 2018-181853, filed Sep. 27, 2018, the entire disclosures of which are incorporated herein by reference.

TECHNICAL FIELD

The present invention relates to a powder material for an air electrode in a solid oxide fuel cell, and a method for producing the powder material.

BACKGROUND ART

Fuel cells have been recently attracting attention as a clean energy source. Among them, a solid oxide fuel cell (SOFC) using an ion-conductive solid oxide as its electrolyte is excellent in power generation efficiency. The SOFC operates at a temperature as high as about 800° C. to 1000° C. and can use the exhaust heat. Moreover, the SOFC can operate with various fuels, such as hydrocarbon and carbon monoxide gas, and it is therefore expected to be widely used from household applications to large-scale power generation applications. The SOFC usually includes an air electrode (cathode), a fuel electrode (anode), and an electrolyte layer interposed therebetween.

The air electrode is formed of, for example, a metal composite oxide. The metal composite oxide is synthesized from a mixture of two or more kinds of raw materials by a citric acid method, a solid-phase method, and the like. Patent Literature 1 discloses a method of synthesizing a metal composite oxide using a citric acid method. Patent Literature 2 discloses a method of synthesizing a metal composite oxide using a solid-phase method.

The citric acid method is advantageous in that a metal composite oxide whose composition is uniform on a microscopic level can be obtained, but disadvantageously, the yield is low, and the productivity is not so good. The solid-phase method is one of the industrially advantageous production methods because of its simple production process and ease of composition control.

CITATION LIST

Patent Literature

[PTL 1] Japanese Patent No. 5520210
[PTL 2] Japanese Laid-Open Patent Publication No. 2009-035447

SUMMARY OF INVENTION

Technical Problem

The powder material for an air electrode is required to be fine (e.g., 1 μm or less) in view of achieving a higher reaction efficiency. Therefore, the synthesized metal composite oxide is usually subjected to a pulverization process. In the pulverization process, a medium stirring-type pulverizer is used in some cases. In such a pulverizer, the metal composite oxide is stirred together with a pulverization medium, so that it is pulverized by the collision with the pulverization medium. In this case, impurities derived from the pulverization medium may be included in the resultant powder. The impurities in the powder, if present in a large amount, may cause the electrical conductivity of the obtained air electrode to decrease, which may lower the power generation efficiency.

The powder material for an air electrode is further required to have a high crystallinity. Therefore, in the solid-phase method, the metal composite oxide is desirably synthesized at a high temperature. However, the hardness of a highly crystalline metal composite oxide is high, which tends to make the pulverization medium wear faster. In other words, obtaining a powder with high crystallinity and reducing the impurities included in the powder are in a trade-off relationship.

Solution to Problem

In view of the above, one aspect of the present invention relates to a powder material for an air electrode in a solid oxide fuel cell, the powder material being a powder of a metal composite oxide having a perovskite crystal structure represented by a following general formula:

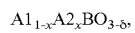
$$A1_{1-x}A2_xBO_{3-\delta},$$

where the element A1 is at least one selected from the group consisting of La and Sm, the element A2 is at least one selected from the group consisting of Ca, Sr, and Ba, the element B is at least one selected from the group consisting of Mn, Fe, Co, and Ni, x satisfies 0<x<1, and δ is an oxygen deficiency amount, the powder having a specific surface area of 20 m²/g or more, the powder satisfying (Crystallite diameter/Specific surface area-based particle diameter)≥0.3, and the powder containing elements M in an amount of 300 ppm or less in terms of atoms, the elements M being other than the element A1, the element A2, the element B, and oxygen.

In view of the above, another aspect of the present invention relates to a method of producing a powder material for an air electrode in a solid oxide fuel cell, the method including: a preparation step of preparing a metal composite oxide having a perovskite crystal structure represented by a following general formula:

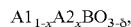
$$A1_{1-x}A2_xBO_{3-\delta},$$

where the element A1 is at least one selected from the group consisting of La and Sm, the element A2 is at least one selected from the group consisting of Ca, Sr, and Ba, the element B is at least one selected from the group consisting of Mn, Fe, Co, and Ni, x satisfies 0<x<1, and δ is an oxygen deficiency amount; and a pulverization step of pulverizing the metal composite oxide with aluminum oxide beads, into a powder having a specific surface area of 20 m²/g or more and satisfying (Crystallite diameter/Specific surface area-based particle diameter)≥0.3.

Advantageous Effects of Invention

The powder material for an air electrode according to the present invention is fine and highly crystalline and contains almost no impurities.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS (Powder Material for Air Electrode)

A powder material for an air electrode according to an embodiment of the present invention includes a metal composite oxide having a perovskite crystal structure represented by a following general formula (1):

$$A1_{1-x}A2_xBO_{3-\delta} \quad (1).$$

The element A1 is at least one selected from the group consisting of La (lanthanum) and Sm (samarium). The element A2 is at least one selected from the group consisting of Ca (calcium), Sr (strontium), and Ba (barium). The element B is at least one selected from the group consisting of Mn (manganese), Fe (iron), Co (cobalt), and Ni (nickel). x satisfies $0<x<1$, and $\delta$ is an oxygen deficiency amount.

The element A1 preferably includes La. La may occupy 90 atom % or more in the element A1. The element A2 preferably includes Sr. Sr preferably occupies 90 atom % or more in the element A2. x is not specifically limited, but preferably satisfies $0.2 \leq x \leq 0.6$, more preferably $0.3 \leq x \leq 0.5$.

The element B preferably includes at least one of Co and Fe. Co or Fe preferably occupies 90 atom % or more in the element B, or when both are included, Co and Fe in total preferably occupy 90 atom % or more in the element B. The element B preferably includes Co and Fe. The atomic ratio of Fe to Co, i.e., Fe/Co, is preferably 2 or more and 6 or less, more preferably 3 or more and 5 or less.

Specific examples of the metal composite oxide include lanthanum strontium cobalt ferrite (LSCF, $La_{1-x1}Sr_{x1}Co_{1-y1}Fe_{y1}O_{3-\delta}$, $0<x1<1$, $0<y1<1$), lanthanum strontium manganite (LSM, $La_{1-x2}Sr_{x2}MnO_{3-\delta}$, $0<x2<1$), lanthanum strontium cobaltite (LSC, $La_{1-x3}Sr_{x3}CoO_{3-\delta}$, $0<x3<1$), samarium strontium cobaltite (SSC, $Sm_{1-x4}Sr_{x4}CoO_{3-\delta}$, $0<x4<1$), and lanthanum strontium calcium manganite (LSCM, $La_{1-x5-y2}Sr_{x5}Ca_{y2}MnO_{3-\delta}$, $0<x5<1$, $0<y2<1$). In view of the electrical conductivity and the coefficient of thermal expansion, preferred is LSCF in which the element A1 is La, the element A2 is Sr, and the element B is Co and Fe.

The powder material for an air electrode (hereinafter sometimes referred to as ABO powder) according to the present embodiment is mostly composed of the above metal composite oxide. In other words, in the ABO powder, the amount of impurities (i.e., elements M other than the element A1, the element A2, the element B, and oxygen) is very small. Specifically, the ABO powder contains the elements M in an amount of 300 ppm or less in terms of atoms. The content of the elements M in the ABO powder is preferably 150 ppm or less in terms of atoms.

The ABO powder can be obtained by, for example, pulverizing a metal composite oxide synthesized from a mixture of two or more kinds of raw materials. In this case, the elements M are mainly derived from a pulverization medium used in the pulverization process. Typical examples of the elements M include Zr (zirconium), Al (aluminum), and Si (silicon).

Zr, Al and Si are present in the ABO powder in the form of, for example, an oxide. The oxides of these elements usually have electrically insulating properties and cause the electrical conductivity to decrease. In light of this, in the present embodiment, the total content of Zr, Al and Si in the ABO powder is set to 300 ppm or less in terms of atoms. In this case, the electrical conductivity is unlikely to decrease. This leads to an improved output density of the fuel cell.

The aluminum oxide is considered to hinder the sinterability. Therefore, in the case of producing an air electrode by sintering the ABO powder containing an oxide of Al (aluminum), the porosity of the resultant air electrode tends to increase. With this considered, Al (aluminum) may be contained as the elements M. The Al (aluminum) content in the ABO powder is preferably 1 ppm or more in terms of atoms. Al may occupy 50 atom % or more or 65 atom % or more in the elements M. For example, when Al and Zr are contained as the elements M, the content of Al may be higher than that of Zr in terms of atoms.

The amount of each of the elements contained in the ABO powder can be determined by high-frequency inductively coupled plasma emission spectroscopy (ICP emission spectroscopy) in accordance with JIS K 0116. The content of the elements M is determined as a ratio of the number of atoms of the elements M to the total number of atoms of the elements A1, A2, and B, oxygen, and the elements M.

The ABO powder has a specific surface area of 20 m²/g or more. When the surface area of the ABO powder is in this range, the ABO powder is pulverized finely enough to be suitably applicable as a material for an air electrode. In this case, the air (oxidant), the air electrode and the electrolyte form a larger three-phase interface, to increase the reaction activity of the whole electrode. The specific surface area of the ABO powder is preferably 21 m²/g or more. The specific surface area of the ABO powder is preferably 40 m²/g or less, more preferably 35 m²/g or less. With a specific surface area of 40 m²/g or less, the ABO powder is unlikely to be sintered excessively, when subjected a heat treatment for forming an air electrode. Therefore, the resultant air electrode is not excessively densified and has good air diffusibility. The specific surface area is measured in accordance with JIS Z 8830: 2013 by a BET method.

The crystallinity of the ABO powder is evaluated from, for example, a ratio of a crystallite diameter to a specific surface area-based particle diameter (Crystallite diameter/ Specific surface area-based particle diameter, hereinafter referred to as a crystalline parameter P1). Here, the both diameters should be measured in the same unit. The nearer to one the crystalline parameter P1 is, the more the ABO powder becomes like a single crystal, and the crystallinity improves.

The ABO powder may include secondary particles which are agglomerates of particles. The crystalline parameter P1 is an index of the crystallinity of the ABO powder, which is calculated by excluding the influence of the secondary particles. The specific surface area-based particle diameter refers to, given that the ABO powder has a shape of a true sphere, a diameter of the true sphere calculated from the specific surface area and the density of the ABO powder. The crystallite diameter corresponds to a size of the single crystal calculated from the half width of a diffraction peak in the X-ray diffraction pattern. When the crystalline parameter P1 is 1, the specific surface area-based particle diameter is equal to the crystallite diameter. Usually, the specific surface area-based particle diameter is larger than the crystallite diameter, and the crystalline parameter P1 is less than 1.

The ABO powder according to the present embodiment satisfies Crystalline parameter $P1 \geq 0.3$. The crystalline parameter P1 is preferably 0.35 or more, more preferably 0.37 or more. When the crystalline parameter P1 of the ABO powder is 0.3 or more, the crystallinity of the ABO powder is sufficiently high. Therefore, the air electrode formed of the ABO powder has excellent electrical conductivity and reaction activity.

The crystallite diameter is not specifically limited, but is preferably 10 nm or more, more preferably, 15 nm or more. The crystallite diameter is preferably 50 nm or less, more preferably, 20 nm or less.

The crystallite diameter can be calculated from a half width of a diffraction peak in the X-ray diffraction pattern of the ABO powder, using Scherrer's formula below.

Crystallite diameter=$K \cdot \lambda / \beta \cos \theta$, where
K: Scherrer constant (=1)
$\lambda$: X-ray wavelength (Cu-K$\alpha$, 1.5418 Å)
$\beta$: half width (unit: rad)
$\theta$: Bragg angle (½ of diffraction angle 2$\theta$)

The specific surface area-based particle diameter is not specifically limited, but is preferably 10 nm or more, more preferably, 15 nm or more. Also, the specific surface area-based particle diameter is, for example, preferably 50 nm or less, more preferably, 45 nm or less.

The specific surface area-based particle diameter is calculated from the specific surface area measured as above, using a conversion formula below. Here, the theoretical density p is determined by adding up a true density of each of the oxide components constituting the ABO powder according to its percentage in the composition.

$S = 6/(\beta \cdot d)$, where
S: specific surface area
$\rho$: theoretical density of ABO powder
d: specific surface area-based particle diameter (unit: µm)

The ABO powder is preferably excellent in both crystallinity and dispersibility (i.e., particles are less agglomerated) because in this case the electrical conductivity tends to improve. The crystallinity and the dispersibility of the ABO powder can be evaluated from a ratio of a crystallite diameter to an average particle diameter (Crystallite diameter/Average particle diameter, hereinafter, a crystallinity parameter P2). The crystallinity parameter P2 includes the influence of the secondary particles of the ABO powder. Here, the both dimeters should be measured in the same unit. The nearer to 1 the crystalline parameter P2 is, the higher the crystallinity and the dispersibility of the ABO powder is. Usually, the average particle diameter is larger than the crystallite diameter, and the crystalline parameter P2 is less than 1.

The ABO powder according to the present embodiment preferably satisfies Crystallinity parameter P2≥0.05. The crystallinity parameter P2 is preferably 0.053 or more, more preferably 0.055 or more. When the crystallinity parameter P2 is 0.05 or more, the dispersibility and the crystallinity of the particles constituting the ABO powder are sufficiently high. The crystallinity parameters P1 and P2 are not necessarily correlated with each other. Even when the ABO powder satisfies Crystallinity parameter P2≥0.05, the crystallinity parameter P1 can be less than 0.3. In this case, the crystallinity of the ABO powder is not satisfactory.

The average particle diameter is not specifically limited, but is preferably 0.01 µm or more, more preferably, 0.015 µm or more. The average particle diameter is preferably 1.5 µm or less, more preferably, 1.25 µm or less.

The average particle diameter is a particle diameter at 50% cumulative volume in a volumetric particle size distribution measured by a laser diffractometry (this applies hereinafter).

(Production Method of Powder Material for Air Electrode)

The ABO powder is produced by a method including, for example, a preparation step of preparing a metal composite oxide represented by the aforementioned general formula (1), and a pulverization step of pulverizing the metal composite oxide with aluminum oxide beads (hereinafter sometimes referred to as alumina beads), to give a powder having a specific surface area of 20 m$^2$/g or more and satisfying Crystallinity parameter P1≥0.3.

Usually, when the metal composite oxide is pulverized until its crystalline parameter P1 satisfies the above, and its specific surface area becomes 20 m$^2$/g, a resultant pulverized product will contain a large amount of impurities derived from the pulverization medium. However, by using the alumina beads as the pulverization medium, the amount of the impurities contained in the pulverized product is significantly reduced. Although the reason is unclear, it is presumably related to the hardness of the alumina beads. The alumina beads are moderately hard enough not to be severely chipped or broken and only to be deformed, even when collided with the metal composite oxide. For example, the hardness of the alumina beads may be smaller than the hardness of the metal composite oxide.

In view of further reducing the impurity content, the alumina beads above are preferably aluminum oxide beads having a purity of 99.99 mass % or more (hereinafter sometimes referred to as high purity alumina beads).

(Preparation Step)

A metal composite oxide having a perovskite crystal structure represented by the aforementioned general formula (1) is prepared. The metal composite oxide is, for example, particulate or lumpy.

The metal composite oxide is obtained by, for example, a solid-phase method using a mixture of a first compound containing the element A1, a second compound containing the element A2, and a third compound containing the element B. In the solid-phase method, the mixture is heated at a high temperature.

The first compound may be selected as appropriate depending on the kind of the element A1 which is at least one selected the group consisting of La and Sm. Examples of the first compound include lanthanum carbonate (La$_2$(CO$_3$)$_3$), lanthanum hydroxide (La(OH)$_3$), lanthanum oxide (La$_2$O$_3$), samarium carbonate (Sm$_2$(CO$_3$)$_3$), samarium hydroxide (Sm(OH)$_3$), and samarium oxide (Sm$_2$O$_3$).

The second compound may be selected as appropriate depending on the kind of the element A2 which is at least one selected the group consisting of Ca, Sr, and Ba. Examples of the second compound include strontium carbonate (SrCO$_3$), strontium hydroxide (Sr(OH)$_2$), calcium carbonate (CaCO$_3$), calcium hydroxide (Ca(OH)$_2$), barium carbonate (BaCO$_3$), and barium hydroxide (Ba(OH)$_2$).

The third compound may be selected as appropriate depending on the kind of the element B which is at least one selected the group consisting of Mn, Fe, Co, and Ni. Examples of the third compound include manganese oxide (Mn$_3$O$_4$), manganese carbonate (MnCO$_3$), iron oxide (Fe$_2$O$_3$), cobalt oxide (Co$_3$O$_4$), cobalt carbonate (CoCO$_3$), nickel oxide (NiO), and nickel carbonate (NiCO$_3$).

The temperature to heat the mixture is not specifically limited, but the heating temperature is preferably 1250° C. or more, in view of facilitating the diffusion of each element.

The heating temperature is more preferably 1300° C. or more, further more preferably 1400° C. or more. When the mixture is heated at such a high temperature, the resultant metal composite oxide tends to be more highly crystalline and have a higher hardness. According to the present embodiment, even in the case of pulverizing such a metal composite oxide having a high hardness, the amount of impurities to enter the metal composite oxide can be reduced. Furthermore, according to the present embodiment, the crystallinity of the metal composite oxide is likely to be maintained.

The resultant metal composite oxide may be crushed before being subjected to the pulverization step. This makes it easier to pulverize the metal composite oxide with the alumina beads in the pulverization step. The metal composite oxide is crushed to have a specific surface area of, for example, 0.2 m$^2$/g or more and 1 m$^2$/g or less.

The crushing method is not specifically limited, and may use a pulverizer selected as appropriate from a coarse pulverizer, an intermediate pulverizer, a fine pulverizer, a triturator, and the like. The crushing may be performed using a crusher, a cutter mill, a stone mill, a mortar, a mortar machine, and the like.

(Preliminary Pulverization Step)

The method further includes, after the preparation step and before the pulverization step, a preliminary pulverization step of pulverizing the metal composite oxide to have a specific surface area of 2 m$^2$/g or more and less than 20 m$^2$/g. This makes the metal composite oxide pulverized more easily with the alumina beads. The metal composite oxide subjected to the preliminary pulverization step may be crushed in advance as mentioned above. By pulverizing the metal composite oxide step by step, the efficiency of the pulverization with the alumina beads can be enhanced. The enhanced efficiency of the pulverization leads to a further reduced impurity content.

The preliminary pulverizing method is not specifically limited, and may use a pulverizer selected as appropriate from those exemplified above. The preliminary pulverization may be performed using a roller mill, a jet mill, a hammer mill, a rotary mill, a planetary mill, and the like. In the preliminary pulverization, a pulverization medium may be used. As long as the specific surface area is in the above range, impurities derived from the pulverizing media hardly occur. The pulverization medium used in the preliminary pulverization may be alumina beads, and may be other known pulverizing media. The duration of pulverization is not specifically limited, and may be set as appropriate so that the specific surface area becomes 2 m$^2$/g or more and less than 20 m$^2$/g.

(Pulverization Step)

The obtained metal composite oxide or a product obtained by preliminary pulverization thereof is pulverized with alumina beads, into an ABO powder having a specific surface area of 20 m$^2$/g or more and satisfying Crystalline parameter P1≥0.3. The resultant ABO powder preferably further satisfies Crystalline parameter P2≥0.05. According to the present embodiment, an ABO powder satisfying both Crystalline parameter P1≥0.3 and Crystalline parameter P2≥0.05 can be obtained.

The pulverizing method uses alumina beads and a medium-stirring type pulverizer (e.g., planetary mill). The pulverization may be done in a wet or dry process. In a wet pulverization, the medium may be ion-exchanged water, in view of reducing the amount of the impurities derived from the medium. The duration of pulverization is not specifically limited, and may be set as appropriate so that the specific surface area of the resultant ABO powder becomes 20 m$^2$/g or more. In view of reducing the impurity content, the duration of pulverization may be set as appropriate so that the specific surface area of the ABO powder becomes 40 m$^2$/g or less.

The alumina beads may have any average particle diameter, which may be, for example, 0.3 mm or more and 1.5 mm or les, and may be 0.5 mm or more and 1 mm or less.

The present invention will be specifically described below by way of Examples of the present invention. It is to be noted, however, that these Examples are not intended to limit the present invention.

A description will be given first of a measuring or calculating method of each physical value.

(a) Specific Surface Area

The measurement was made by a BET method using a specific surface area analyzer (Macsorb HM-1220, available from Mountech Co., Ltd.). Pure nitrogen was used as an adsorption gas, and held for 30 min at 230° C.

(b) Average Particle Diameter (D50)

The measurement was made using a laser diffraction-scattering type particle size distribution analyzer (MT-3300EXII, available from MicrotracBEL Corp.), under the following conditions.

Measurement mode: MT-3300
Particle refractive index: 2.40
Refractive index of liquid medium: 1.333

(c) Quantitative analysis of elements

An ICP emission spectrometer (SPS3100-24HV, available from Hitachi High-Tech Science Corporation) was used.

(d) Crystallite Diameter

Using an X-ray diffractometer (RINT TTRIII, available from Rigaku Corporation, radiation source: CuKα, with monochromator, X-ray tube voltage: 50 kV, current: 300 mA, long slit PSA200 (overall length: 200 mm, designed opening angle: 0.057°)), a diffraction pattern was acquired under the following conditions.

Measuring method: parallel (continuous)
Scanning speed: 5° per minute
Sampling width: 0.04°
2 θ: 20 to 60°

From a half width of a diffraction peak corresponding to the (024) plane of the perovskite phase in the acquired diffraction pattern, a crystallite diameter was calculated using Scherrer's formula.

$$\text{Crystallite diameter} = K \cdot \lambda / \beta \cos \theta,$$

where
K: Scherrer constant (=1)
λ: X-ray wavelength (Cu-Kα, 1.5418 Å)
β: half width (unit: rad)
θ: Bragg angle (½ of diffraction angle 2θ)

(e) Specific Surface Area-Based Particle Diameter

From the specific surface area measured in (a), a specific surface area-based particle diameter was calculated using a conversion formula below. For p (density of sample powder) of a metal composite oxide represented by $La_{0.6}Sr_{0.4}Co_{0.2}Fe_{0.8}O_{3-\delta}$, 5.79 g/cm$^3$ (theoretical density) was used, and for p (sample powder density) of a metal composite oxide represented by $La_{0.6}Sr_{0.4}CoO_{3-\delta}$, 6.14 g/cm$^3$ (theoretical density) was used.

$$S = 6/(\rho \cdot d),$$

where
S: specific surface area
ρ: density of sample powder
d: specific surface area-based particle diameter

Example 1

(1) Preparation Step

First, 73.96 g of lanthanum carbonate ($La_2(CO_3)_3$, available from Wako Pure Chemical Industries, Ltd.), 31.80 g of strontium carbonate ($SrCO_3$, available from Wako Pure Chemical Industries, Ltd.), 8.64 g of cobalt oxide ($Co_3O_4$, available from Wako Pure Chemical Industries, Ltd.), and 34.40 g of iron oxide ($Fe_2O_3$, available from Wako Pure Chemical Industries, Ltd.) were put into a resin pot with a volume of 500 mL.

Into the resin pot, 150 mL of zirconia beads having a diameter of 1.5 mm and 250 mL of ion-exchanged water were added, and they were wet-mixed at 180 rpm for 5 min using a planetary ball mill (P-5, available from Fritsch Co., Ltd.). Next, the beads were taken out, followed by heating at 150° C., to give a raw material mixture from which moisture has been removed.

The raw material mixture was put into an aluminum oxide crucible, and the crucible was placed in an electric furnace (SB-2025, available from Motoyama Corporation) and heated at 1400° C. for 2 h. Thereafter, the mixture was crushed with an agate mortar, and passed through a sieve having an aperture of 500 μm, to give particles.

The particles were identified by X-ray diffractometer, as an LSCF having a perovskite-type structure represented by a composition formula: $La_{0.6}Sr_{0.4}Co_{0.2}Fe_{0.8}O_{3-\delta}$.

The specific surface area of the particles was 0.35 m²/g, and the average particle diameter thereof was 11 μm.

(2) Preliminary Pulverization Step

The particles were pulverized using a supersonic jet mill (PJM-200SP, available from Nippon Pneumatic Mfg. Co., Ltd.) at a milling pressure of 0.6 MPa and a feeding rate of 50 g/min, to give a preliminary pulverized product.

The preliminary pulverized product was subjected to ICP emission spectroscopy. The result found that the Zr content was 33 ppm, and the Al content was 8 ppm. The specific surface area of the preliminary pulverized product was 2.5 m²/g, and the average particle diameter thereof was 1.8 μm.

(3) Pulverization Step

First, 100 g of the preliminary pulverized product was put into a resin pot (volume: 500 mL). Into the resin pot, 165 mL of aluminum oxide beads having a diameter of 0.5 mm (TB-05, purity: 99.99 mass % or more, available from TAIMEI CHEMICALS Co., Ltd.) and 150 mL of ion-exchanged water (liquid medium for wet pulverization) were added, and they were wet-mixed at 240 rpm for 240 min using a planetary ball mill (P-5, available from Fritsch Co., Ltd.). Next, the beads were taken out, followed by heating at 110° C., to give an ABO powder X1 from which moisture has been removed.

The ABO powder X1 was identified by X-ray diffractometer, as an LSCF having a perovskite-type structure represented by a composition formula: $La_{0.6}Sr_{0.4}Co_{0.2}Fe_{0.8}O_{3-\delta}$.

The ABO powder X1 was subjected to ICP emission spectroscopy. The result found that Zr and Al were contained as the elements M, and the Zr content and the Al content were 25 ppm and 51 ppm, respectively, in term of atoms.

The specific surface area of the ABO powder X1 was 21.5 m²/g, the average particle diameter thereof was 0.29 μm, and the crystallite diameter was 17 nm.

Example 2

An ABO powder X2 was obtained in the same manner as in Example 1, except that the duration of pulverization was set to 695 min in the pulverization step (3).

The ABO powder X2 was identified by X-ray diffractometer, as an LSCF having a perovskite-type structure represented by a composition formula: $La_{0.6}Sr_{0.4}Co_{0.2}Fe_{0.8}O_{3-\delta}$.

The ABO powder X2 was subjected to ICP emission spectroscopy. The result found that Zr and Al were contained as the elements M, and the Zr content and the Al content were 32 ppm and 101 ppm, respectively, in term of atoms.

The specific surface area of the ABO powder X2 was 31.9 m²/g, the average particle diameter thereof was 0.26 μm, and the crystallite diameter was 15 nm.

Example 3

(1) Preparation Step

First, 75.04 g of lanthanum carbonate ($La_2(CO_3)_3$, available from Wako Pure Chemical Industries, Ltd.), 31.94 g of strontium carbonate ($SrCO_3$, available from Wako Pure Chemical Industries, Ltd.), and 43.02 g of cobalt oxide ($Co_3O_4$, available from Wako Pure Chemical Industries, Ltd.) were put into a resin pot with a volume of 500 mL.

Into the resin pot, 150 mL of zirconia beads having a diameter of 1.5 mm and 250 mL of ion-exchanged water were added, and they were wet-mixed at 180 rpm for 5 min using a planetary ball mill (P-5, available from Fritsch Co., Ltd.). Next, the beads were taken out, followed by heating at 150° C., to give a raw material mixture from which moisture has been removed.

The raw material mixture was put into an aluminum oxide crucible, and the crucible was placed in an electric furnace (SB-2025, available from Motoyama Corporation) and heated at 1300° C. for 2 h. Thereafter, the mixture was crushed with an agate mortar, and passed through a sieve having an aperture of 500 μm, to give particles.

The particles were identified by X-ray diffractometer, as an LSC having a perovskite-type structure represented by a composition formula: $La_{0.6}Sr_{0.4}CoO_{3-\delta}$.

The specific surface area of the particles was 0.15 m²/g, and the average particle diameter thereof was 16 μm.

(2) Preliminary Pulverization Step

The particles were pulverized using a supersonic jet mill (PJM-200SP, available from Nippon Pneumatic Mfg. Co., Ltd.) at a milling pressure of 0.6 MPa and a feeding rate of 50 g/min, to give a preliminary pulverized product.

The preliminary pulverized product was subjected to ICP emission spectroscopy. The result found that the Zr content was 34 ppm, and the Al content was 10 ppm. The specific surface area of the preliminary pulverized product was 3.0 m²/g, and the average particle diameter thereof was 2.0 μm.

(3) Pulverization Step

First, 100 g of the preliminary pulverized product was put into a resin pot (volume: 500 mL). Into the resin pot, 165 mL of aluminum oxide beads having a diameter of 0.5 mm (TB-05, purity: 99.99 mass % or more, available from TAIMEI CHEMICALS Co., Ltd.) and 150 mL of ion-exchanged water (liquid medium for wet pulverization) were added, and they were wet-mixed at 240 rpm for 220 min using a planetary ball mill (P-5, available from Fritsch Co., Ltd.). Next, the beads were taken out, followed by heating at 110° C., to give an ABO powder X3 from which moisture has been removed.

The ABO powder X3 was identified by X-ray diffractometer, as an LSC having a perovskite-type structure represented by a composition formula: $La_{0.6}Sr_{0.4}CoO_{3-\delta}$.

The ABO powder X3 was subjected to ICP emission spectroscopy. The result found that Zr and Al were contained as the elements M, and the Zr content and the Al content were 34 ppm and 64 ppm, respectively, in term of atoms.

The specific surface area of the ABO powder X3 was 20.9 m²/g, the average particle diameter thereof was 0.26 μm, and the crystallite diameter was 16 nm.

Comparative Example 1

An ABO powder Y1 was obtained in the same manner as in Example 1, except that the high purity alumina beads were replaced with zirconia having a diameter of 0.5 mm (YTZ, available from Nikkato Corporation), the number of revolutions was set to 210 rpm, and the duration of pulverization was set to 160 min in the pulverization step (3).

The ABO powder Y1 was identified by X-ray diffractometer, as an LSCF having a perovskite-type structure represented by a composition formula: $La_{0.6}Sr_{0.4}Co_{0.2}Fe_{0.8}O_{3-\delta}$.

The ABO powder Y1 was subjected to ICP emission spectroscopy. The result found that Zr and Al were contained as the elements M, and the Zr content and the Al content were 2920 ppm and 32 ppm, respectively, in term of atoms.

The specific surface area of the ABO powder Y1 was 21.1 m²/g, the average particle diameter thereof was 0.30 μm, and the crystallite diameter was 15 nm.

Comparative Example 2

An ABO powder Y2 was obtained in the same manner as in Example 1, except that the high purity alumina beads were replaced with zirconia beads having a diameter of 1 mm (YTZ, available from Nikkato Corporation), the number of revolutions was set to 210 rpm, and the duration of pulverization was set to 160 min in the pulverization step (3).

The ABO powder Y2 was identified by X-ray diffractometer, as an LSCF having a perovskite-type structure represented by a composition formula: $La_{0.6}Sr_{0.4}Co_{0.2}Fe_{0.8}O_{3-\delta}$.

The ABO powder Y2 was subjected to ICP emission spectroscopy. The result found that Zr and Al were contained as the elements M, and the Zr content and the Al content were 3080 ppm and 30 ppm, respectively, in term of atoms.

The specific surface area of the ABO powder Y2 was 22 m²/g, the average particle diameter thereof was 0.37 μm, and the crystallite diameter was 17 nm.

Comparative Example 3

A raw material mixture was prepared in the same manner as in Example 1, to give particles.

The resultant particles were subjected to the pulverization step (3) without performing the preliminary pulverization step (2).

An ABO powder Y3 was obtained in the same manner as in Example 1, except that the high purity alumina beads were replaced with zirconia beads having a diameter of 1 mm (YTZ, available from Nikkato Corporation), the number of revolutions was set to 210 rpm, and the duration of pulverization was set to 120 min in the pulverization step (3).

The ABO powder Y3 was identified by X-ray diffractometer, as an LSCF having a perovskite-type structure represented by a composition formula: $La_{0.6}Sr_{0.4}Co_{0.2}Fe_{0.8}O_{3-\delta}$.

The ABO powder Y3 was subjected to ICP emission spectroscopy. The result found that Zr and Al were contained as the elements M, and the Zr content and the Al content were 3650 ppm and 30 ppm, respectively, in term of atoms.

The specific surface area of the ABO powder Y3 was 18.5 m²/g, the average particle diameter thereof was 0.44 μm, and the crystallite diameter was 19 nm.

Comparative Example 4

Particles were obtained in the same manner as in Example 1, except that the heating temperature was set to 1200° C. in the preparation step (1).

The above particles were identified by X-ray diffractometer, as an LSCF having a perovskite-type structure represented by a composition formula: $La_{0.6}Sr_{0.4}Co_{0.2}Fe_{0.8}O_{3-\delta}$.

The specific surface area of the particles was 0.75 m²/g.

An ABO powder Y4 was obtained in the same manner as in Comparative Example 3, except that the duration of pulverization was set to 115 min in the pulverization step (3).

The ABO powder Y4 was identified by X-ray diffractometer, as an LSCF having a perovskite-type structure represented by a composition formula: $La_{0.6}Sr_{0.4}Co_{0.2}Fe_{0.8}O_{3-\delta}$.

The ABO powder Y4 was subjected to ICP emission spectroscopy. The result found that Zr and Al were contained as the elements M, and the Zr content and the Al content were 2870 ppm and 35 ppm, respectively, in term of atoms.

The specific surface area of the ABO powder Y4 was 17.6 m²/g, the average particle diameter thereof was 0.25 μm, and the crystallite diameter was 10 nm.

With respect to the ABO powders X1 to X3 and Y1 to Y4 obtained in Examples 1 to 3 and Comparative Examples 1 to 4, the crystallinity parameters P1 and P2 were determined. The results are shown in Table 1.

TABLE 1

|  |  | Ex. 1 | Ex. 2 | Ex. 3 | Com. Ex. 1 | Com. Ex. 2 | Com. Ex. 3 | Com. Ex. 4 |
| --- | --- | --- | --- | --- | --- | --- | --- | --- |
| ABO powder | | X1 | X2 | X3 | Y1 | Y2 | Y3 | Y4 |
| Pre. pulverization | | with | with | with | with | with | without | without |
| Pulverization medium | | high purity $Al_2O_3$ | high purity $Al_2O_3$ | high purity $Al_2O_3$ | $ZrO_2$ | $ZrO_2$ | $ZrO_2$ | $ZrO_2$ |
| Specific surface area (m²/g) | | 21.5 | 31.9 | 20.9 | 21.1 | 22.0 | 18.5 | 17.6 |
| Ave. particle diameter (μm) | | 0.29 | 0.26 | 0.26 | 0.30 | 0.37 | 0.44 | 0.25 |
| Crystallite diameter (nm) | | 17 | 15 | 16 | 15 | 17 | 19 | 10 |
| Elements M (ppm) | Zr | 25 | 32 | 34 | 2920 | 3080 | 3650 | 2870 |
| | Al | 51 | 101 | 64 | 32 | 30 | 30 | 35 |

TABLE 1-continued

|  | Ex. 1 | Ex. 2 | Ex. 3 | Com. Ex. 1 | Com. Ex. 2 | Com. Ex. 3 | Com. Ex. 4 |
|---|---|---|---|---|---|---|---|
| Crystallinity parameter P1 | 0.35 | 0.47 | 0.34 | 0.31 | 0.37 | 0.33 | 0.16 |
| Crystallinity parameter P2 | 0.059 | 0.059 | 0.062 | 0.050 | 0.047 | 0.043 | 0.038 |

Table 1 shows that the ABO powders X1 to X3 obtained in Examples 1 to 3 had a specific surface area of 20 m$^2$/g or more, satisfying Crystallinity parameter P1≥0.3 and Crystallinity parameter P2≥0.05, and containing the elements M in an amount of 300 ppm or less in terms of atoms.

On the other hand, in the ABO powders Y1 to Y3 obtained in Comparative Examples 1 to 3, although the crystallinity parameters P1 were 0.3 or more, the content of the elements M was much higher than those in the ABO powders X1 to X3. The high heating temperature in the preparation step (1) was considered to have contributed to enhance the crystallinity, but presumably, as a result of allowing the pulverization to proceed until the specific surface area became about 20 m$^2$/g, impurities derived from the pulverization medium were increased. In the ABO powder Y4 of Comparative Example 4, the content of the elements M was high, and the crystallinity parameter P1 was low. This was presumably due to the low heating temperature in the preparation step (1) and the omission of the preliminary pulverization step.

Furthermore, in the ABO powders Y2 and Y3 of Comparative Examples 2 and 3, although the crystallinity parameter P1 was almost on the same level as that in the ABO powder X1, the crystallinity parameter P2 was low as compared to that in the ABO powder X1. These results indicate that the pulverization step (3) failed to proceed efficiently in Comparative Example 2 in which zirconia beads having a diameter of 1 mm were used and Comparative Example 3 in which the preliminary pulverization step was omitted. In other words, in Comparative Example 2 and 3, only the surface of the particles was selectively pulverized, which produced microfine particles and increased the specific surface area, but on the other hand, the pulverization of the core portion of the particles or the secondary particles failed to proceed to a satisfactory level.

INDUSTRIAL APPLICABILITY

The powder material for an air electrode according to the present invention is fine and highly crystalline and contains almost no impurities, and therefore, is useful as a material for an air electrode in a solid oxide fuel cell.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A powder material for an air electrode in a solid oxide fuel cell, the powder material comprising:
a powder of a metal composite oxide having a perovskite crystal structure represented by a following general formula:

$Al_{1-x}A2_xBO_{3-\delta}$, where the element A1 is at least one selected from the group consisting of La and Sm, the element A2 is at least one selected from the group consisting of Ca, Sr, and Ba, the element B is at least one selected from the group consisting of Mn, Fe, Co, and Ni, x satisfies 0<x<1, and δ is an oxygen deficiency amount,
the powder having a specific surface area of 20 m$^2$/g or more,
the powder satisfying (Crystallite diameter/Specific surface area-based particle diameter)≥0.3, and
the powder containing elements M in an amount of 300 ppm or less in terms of atoms, the elements M being other than the element A1, the element A2, the element B, and oxygen.

2. The powder material according to claim 1, wherein the powder satisfies (Crystallite diameter/Average particle diameter)≥0.05.

3. The powder material according to claim 2, wherein
the element A1 is La,
the element A2 is Sr, and
the element B is at least one selected from the group consisting of Co and Fe.

4. The powder material according to claim 1, wherein
the element A1 is La,
the element A2 is Sr, and
the element B is at least one selected from the group consisting of Co and Fe.

5. A method of producing a powder material for an air electrode in a solid oxide fuel cell, the method comprising:
a preparation step of preparing a metal composite oxide having a perovskite crystal structure represented by a following general formula:

$Al_{1-x}A2_xBO_{3-\delta}$, where the element A1 is at least one selected from the group consisting of La and Sm, the element A2 is at least one selected from the group consisting of Ca, Sr, and Ba, the element B is at least one selected from the group consisting of Mn, Fe, Co, and Ni, x satisfies 0<x<1, and δ is an oxygen deficiency amount; and
a pulverization step of pulverizing the metal composite oxide with aluminum oxide beads, into a powder having a specific surface area of 20 m$^2$/g or more and satisfying (Crystallite diameter/Specific surface area-based particle diameter)≥0.3.

6. The method of producing a powder material according to claim 5, the method further comprising a preliminary pulverization step of pulverizing the metal composite oxide to have a specific surface area of 2 m$^2$/g or more and less than 20 m$^2$/g, before the pulverization step.

7. The method of producing a powder material according to claim 6, wherein the preparation step includes a step of synthesizing the metal composite oxide by mixing a first compound containing the element A1, a second compound containing the element A2, and a third compound containing the element B, followed by heating at 1250° C. or more.

8. The method of producing a powder material according to claim 7, wherein the powder obtained by the pulverization step satisfies (Crystallite diameter/Average particle diameter)≥0.05.

9. The method of producing a powder material according to claim 8, wherein the aluminum oxide beads have a purity of 99.9 mass % or more.

* * * * *